(12) United States Patent
Srinivasan et al.

(10) Patent No.: US 8,009,907 B1
(45) Date of Patent: Aug. 30, 2011

(54) LOCALIZED, ADAPTIVE VIDEO CONTRAST ENHANCEMENT USING CONTROLLED HISTOGRAM EQUALIZATION

(75) Inventors: Sujith Srinivasan, Karnataka (IN); Nikhil Balram, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 973 days.

(21) Appl. No.: 11/928,562

(22) Filed: Oct. 30, 2007

Related U.S. Application Data

(60) Provisional application No. 60/864,884, filed on Nov. 8, 2006.

(51) Int. Cl.
*G06K 9/00* (2006.01)
(52) U.S. Cl. ........................ 382/168; 382/169
(58) Field of Classification Search ............... 382/168, 382/169, 254, 274; 369/44.14; 359/196.1, 359/820; 348/672, E5.073
See application file for complete search history.

(56) References Cited

U.S. PATENT DOCUMENTS

| | | | | |
|---|---|---|---|---|
| 5,383,168 A | * | 1/1995 | O'Brien et al. | 369/44.14 |
| 6,148,103 A | * | 11/2000 | Nenonen | 382/169 |
| 7,424,148 B2 | * | 9/2008 | Goh | 382/169 |

* cited by examiner

*Primary Examiner* — Anh Hong Do

(57) ABSTRACT

An adaptive histogram equalization-based approach improves contrast in a video signal. For each video frame, the histogram of the pixel luminance values is calculated. The calculated histogram is divided into three programmably-sized regions that are equalized independently of each other. The equalization is performed in a controlled fashion by clamping the peaks of the histogram thereby ensuring limited stretching of sharp peaks. The equalized values are averaged with the original pixel values with a weighting factor that is different for the three regions chosen such that the darker regions are enhanced more than the brighter ones. To ensure smooth enhancement, programmable guard band regions can be defined between the three divisions of the histogram. The statistics calculated from one frame may be used to enhance the next frame to eliminate the need for frame buffers. Many of the calculations may be performed in the inactive time between two frames.

50 Claims, 6 Drawing Sheets

LOCALIZED, ADAPTIVE VIDEO CONTRAST ENHANCEMENT USING CONTROLLED HISTOGRAM EQUALIZATION

CROSS REFERENCE TO RELATED APPLICATION

This claims the benefit of commonly-assigned U.S. Provisional Patent Application No. 60/864,884, filed Nov. 8, 2006, which is hereby incorporated by reference herein in its entirety.

BACKGROUND

The present invention relates generally to image and video processing, and more particularly to contrast enhancement.

Contrast enhancement is used to improve the picture quality of digital video and is often implemented using video processors. Although many image processing techniques exist for contrast enhancement, they are often unsuitable for an ASIC implementation because of their computational complexity and/or storage requirements. Additionally, many image processing techniques might not work for video, because the picture is continuously changing and many algorithms may be prone to artifacts like contouring and saturation of gray levels.

Because contrast enhancement is usually performed in a color space that separates brightness information from color, most algorithms operate on data in formats such as YCbCr, HSV, and the like. For video applications, the YCbCr format is typically used because it is the industry standard for video transmission and storage. The YCbCr format is also typically easier to convert to and from RGB than from HSV. The ease in conversion is important because the final display is usually configured to accept data in RGB format.

Copending, commonly-assigned U.S. patent application Ser. No. 11/295,750, filed Dec. 7, 2005 and hereby incorporated by reference herein in its entirety, describes histogram-based video contrast enhancement technique in which a histogram of pixel luminance for an image is divided into a plurality of regions that are processed independently using equalization techniques. However, one effect of using equalization on a histogram that has been broken into regions is that the effect of a sharp peak in one region of the histogram may distort the results for that region.

It would be desirable to be able to provide video contrast enhancement that is less affected by sharp peaks in the luminance histogram.

SUMMARY

The present invention is directed to adaptive contrast enhancement using an adaptive histogram equalization-based approach to improve contrast in a video signal. For each video frame, the histogram of the pixel luminance values preferably is calculated. The calculated histogram preferably is divided into three regions that preferably are processed independently of the other using contrast limited histogram equalization. Preferably, two guard bands are inserted between the three regions to ensure a smooth enhancement. In addition, the effect of sharp peaks on histogram equalization preferably is reduced by clamping the input histogram so that sharp peaks are avoided. To keep the histogram mathematically consistent, the number of points that were rejected during clamping is distributed, preferably uniformly, among all luminance levels in the histogram. Hence the total number of points in the histogram preferably remains unchanged. This modified histogram preferably is then used in normal equalization.

Thus, in accordance with the present invention there is provided a method for processing a video signal. The method includes deriving a first histogram of a received signal of an image where the first histogram comprises statistical information regarding luminance of pixels in the image, clamping the first histogram at a maximum value, and distributing points in the first histogram above the maximum value to other luminance values in the first histogram to derive a second histogram. A cumulative density function is derived from the second histogram, and an output pixel is provided by processing an input pixel and the cumulative density function.

The invention also includes a method for processing a video signal, including deriving a plurality of histograms from a received signal of an image corresponding to a plurality of luminance regions in the image, providing guard bands between the luminance regions, deriving a plurality of cumulative density functions from the plurality of histograms, and providing an output pixel by processing an input pixel based on one of the plurality of CDFs corresponding to a luminance region in which the input pixel falls.

Apparatus for performing these methods also is provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
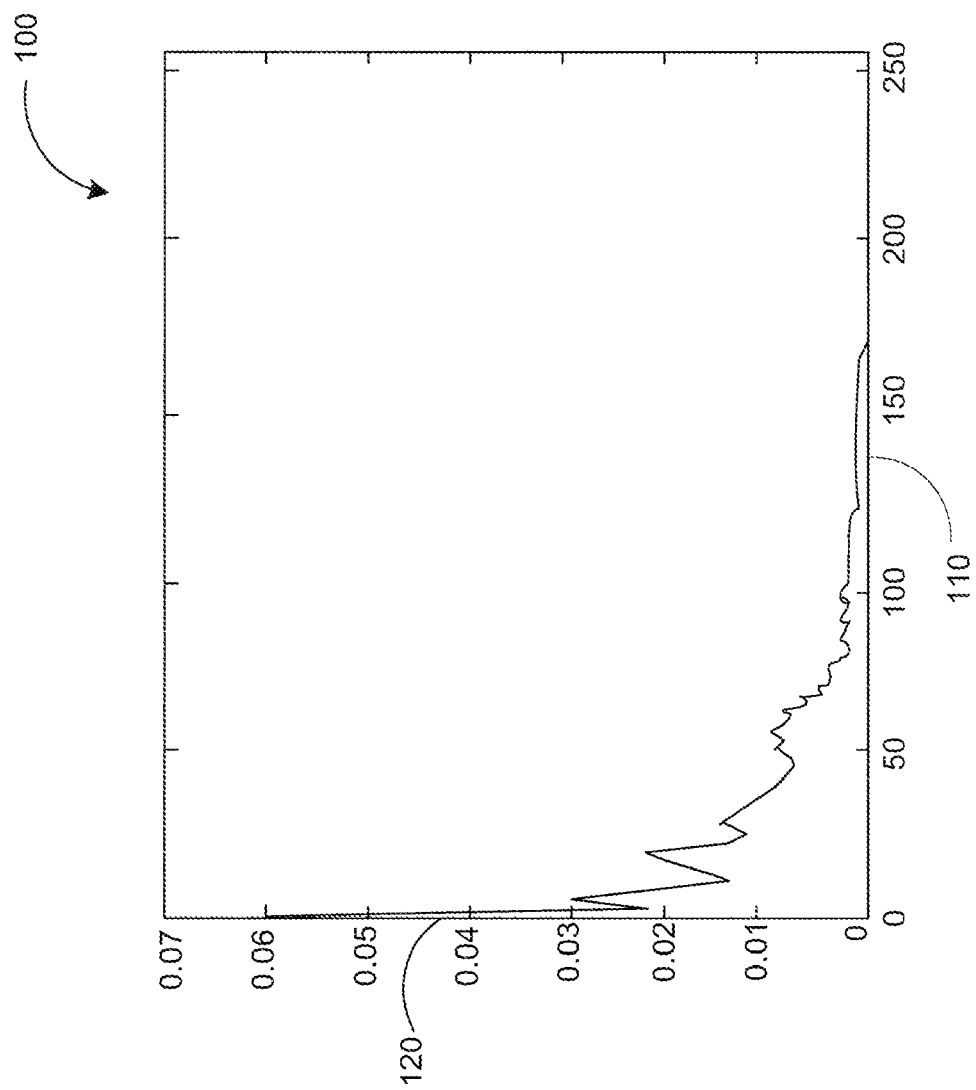
FIG. 1 is an example pre-processing histogram of an image.

The present invention is directed to adaptive contrast enhancement using an adaptive histogram equalization-based approach to improve contrast in a video signal.

Contrast enhancement is performed using the luminance or brightness part of the video signal. The YCbCr color space is typically used for contrast enhancement because the luminance and color information are separate and can be processed independently. The YCbCr color space is also one of the common video exchange formats that are currently used. "Y" is the luminance (sometimes referred to as luma) of the video while "Cb" and "Cr" are the chrominance or color components (sometimes referred to as chroma).

Another advantage of transmitting signals in YCbCr format is that the bandwidth of the signal can also be reduced by down-sampling the chrominance signals. Down-sampling is visually acceptable because the human vision system is typically more sensitive to brightness than to color. Y, Cb and Cr are usually assigned values ranging from 0 to 255 in an 8-bit system. When an offset of 128 is removed from Cb and Cr, the YCbCr space is referred to as the YUV space. In YUV space, U and V range from −128 to 127.

Data in RGB format can be converted to YUV format using a set of linear equations such as:

$$\begin{pmatrix} Y \\ U \\ V \end{pmatrix} = \begin{bmatrix} 0.299 & 0.587 & 0.114 \\ -0.172 & -0.339 & 0.511 \\ 0.511 & -0.428 & -0.083 \end{bmatrix} \begin{pmatrix} R \\ G \\ B \end{pmatrix} \quad (1)$$

where R, G, B and Y range from 0 to 255 while U and V range from −128 to 127. In the following example system, an 8-bit system is demonstrated.

The conversion coefficients in equation (1) are specified by the ITU-601 specification (SDTV) video standard. The inverse equation is used to convert YUV signals into an RGB format as follows:

$$\begin{pmatrix} R \\ G \\ B \end{pmatrix} = \begin{bmatrix} 1 & 0 & 1.371 \\ 1 & -0.698 & -0.336 \\ 1 & 1.732 & 0 \end{bmatrix} \begin{pmatrix} Y \\ U \\ V \end{pmatrix} \quad (2)$$

For each video frame, the histogram of the pixel luminance values may be calculated. The calculated histogram preferably is divided into three regions that preferably are processed independently of each other using contrast-limited histogram equalization. Two guard bands preferably are inserted between the three regions to ensure a smooth enhancement. The equalized values preferably are averaged with the original pixel values using a weighting factor. The weighting factors and other parameters that control the proposed method can be chosen differently for the three regions—e.g., to enhance the darker regions more than the brighter ones or vice-versa. The statistics calculated from one frame preferably are used to enhance the next frame such that frame buffers are not required. Alternatively, if it is desired to enhance a frame using that frame's own statistics, this can be achieved by insertion of a frame buffer stage between the generation of the statistics and the application of the statistics to perform the enhancement. Many of the calculations may be performed in the inactive time between two frames.

FIG. 1 is an example pre-processing histogram of an image. Histogram equalization is an image processing technique that is used to improve picture contrast. A histograms of an image typically represents a count of the number of pixels of the image at each luminance level. The x-axis 110 of the histogram 100 represents luminance values ranging from 0 to 255. The y-axis 120 represents the number of pixels at each luminance value. When the values on the y-axis are divided by the total number of pixels in the image, the values represent the probability or frequency of occurrence of each such luminance value in that image. In the example histogram 100, the frequency of occurrence is shown as a probability density function (PDF). The histogram provides information about the brightness properties of the image but spatial information is not ordinarily preserved. Thus images have an associated histogram, but histograms ordinarily may not be used to derive an image.

Figure 2:
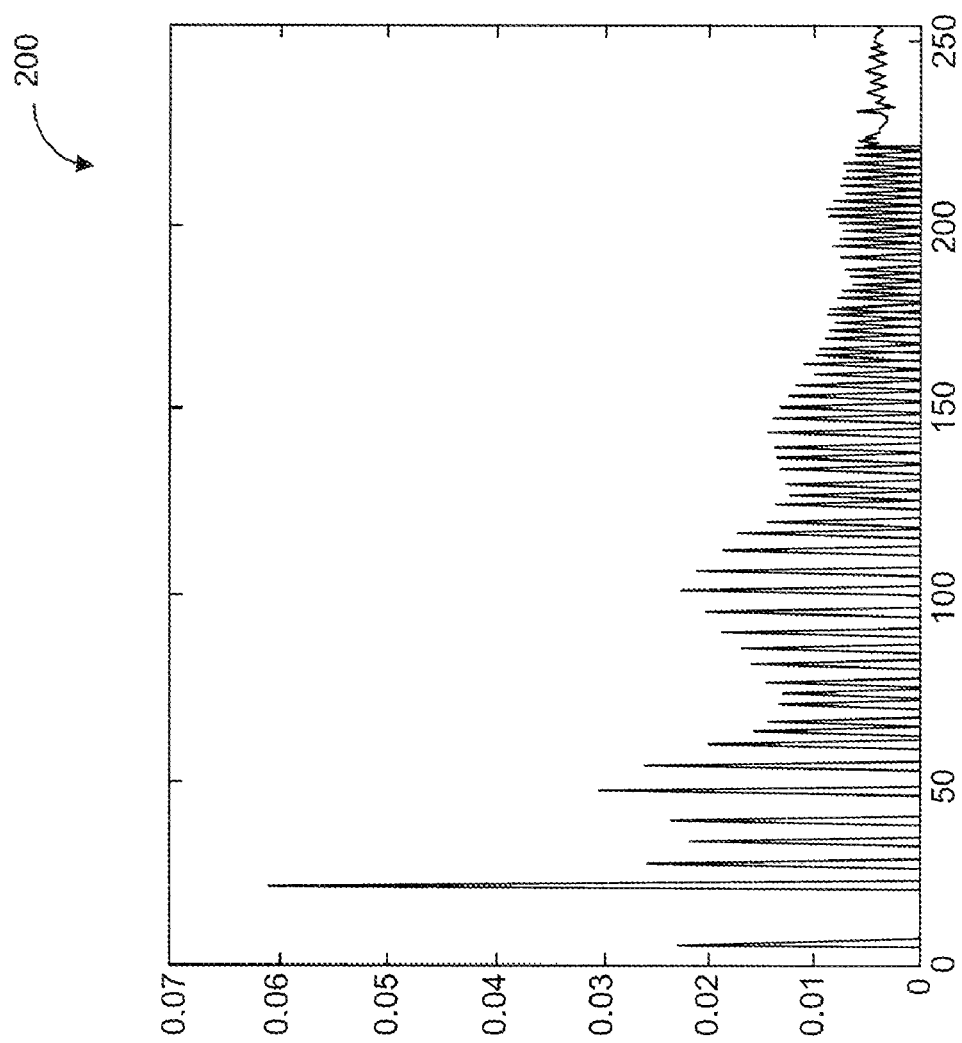
FIG. 2 is an example histogram of an image that has been equalized.

FIG. 2 is an exemplary histogram 200 of an image that has been equalized using a previously known technique. Histogram equalization operates in accordance with the principle that images with good contrast typically have substantially uniform histograms, although in practice, there may be exceptions. For histograms that are skewed to low luminance values (or that are concentrated within a particular range of luminance values), the appearance of the image can be improved with contrast enhancement.

Histogram equalization attempts to "stretch" the histogram to improve the picture contrast. Comparing histogram 100 with histogram 200, it is evident that the effect of equalization is to stretch the peaks of the histogram while compressing the troughs of the histogram.

Mathematically, histogram equalization can be described as follows:

If N is the total number of pixels in the image and $n_k$ is the number of pixels with luminance value $y_k$, then the probability density function (PDF) can be defined as $$f_k(y) = \frac{n_k}{N} \quad (3)$$

and the cumulative density function (CDF) can be defined as $$F_k(y) = \sum_{i=0}^{i=k} f_k(y_i) \quad (4)$$

A CDF at any luminance $y_k$ represents the probability of a pixel having a luminance value equal to or less than $y_k$ in the image. The CDF is a non-decreasing function that varies from $F_k(0)$ (the probability of points with luminance value 0) to $F_k(255)=1$ (the probability of points with luminance value being less than or equal to 255, assuming an 8-bit system). The histogram, which is a count of the number of pixels at each luminance level, is a scaled representation of the PDF.

Where $y_{min}$ is the lowest luminance value in the video system and $y_{max}$ is the highest luminance value in the video system, for every input pixel $y_{in}$ the output $y_{eq}$ can be given by $$y_{eq} = y_{min} + (y_{max} - y_{min}) F_k(y_{in}) \quad (5)$$

Thus for every input pixel, equation (5) gives a mapping to find the output in accordance with the CDF.

By itself, histogram equalization is not typically used in conventional contrast enhancement because it is prone to contouring, noise enhancement and gray level crushing. This can be seen from FIG. 3. The histogram 301 on the upper left is the histogram of a relatively dark image, while the histogram 302 on the upper right is the equalized version, which produces an image with too little contrast, or a "washed-out" appearance. The major reason for this is that sharp peaks in the histogram are stretched too much. Sharp peaks in a histogram are usually produced by flat areas in an image with nearly constant gray levels. When these peaks are stretched too much, the flat area looks contoured. Above-incorporated application Ser. No. 11/295,750 describes an attempt to reduce the effect of sharp peaks by calculating the variance of the histogram. A very low or very high variance value indicates that the histogram has one or more sharp peaks. When this situation was encountered, the technique of application Ser. No. 11/295,750 would attempt to reduce the effect of histogram equalization by blending the equalized luminance values with the original luminance values using a weighting factor dependent on the shape of the histogram.

In one embodiment of that adaptive contrast enhancement scheme, the histogram first would be divided into three programmable sized regions, corresponding to "shadows", "mid-tones" and "highlights" in standard terminology used in photography, where the CDF of each region was found separately. The splitting of the histogram into three regions facilitated processing each region independently of the other. Splitting the image into a dark region, a mid-level brightness region, and a bright region allows independent processing of the regions in accordance with the kind of region. For example, a greater level of enhancement is desired in the dark regions of the image to obtain a perceptually more pleasing image. Compared to the dark regions, the mid level regions and bright regions of the image are typically enhanced less. Dividing the histogram and treating each partition separately enabled this functionality.

In a method according to the present invention, the emphasis on sharp peaks in histogram equalization is reduced in a more targeted fashion using a process called contrast-limited histogram equalization (CLHE). CLHE works by clamping the input histogram so that sharp peaks are avoided. To keep the histogram mathematically consistent as a representation of the PDF, the number of points that were rejected during clamping is distributed to the remaining luminance levels of the histogram in equal measure. Hence the total number of points in the histogram remains unchanged. This modified histogram is then used in a normal equalization.

The clamping level can be related to the maximum slope in the CDF. Sharp peaks in the histogram result in high-sloped regions in the corresponding portions of the CDF. By clamping the peaks, the slope of the CDF is limited. Conversely, by defining the maximum permissible slope in the CDF, the clamping level in the input histogram can be calculated as follows. Let $y_1$ and $y_2$ be two luminance levels and the corresponding CDF values be $F(y_1)$ and $F(y_2)$. Then the slope of the CDF can be approximated by $$\text{slope} = \frac{F(y_2) - F(y_1)}{y_2 - y_1} \quad (6)$$

if these two luminance levels are as close to each other as possible—e.g., if $y_1$ and $y_2$ are successive luminance values. In that case $F(y_2)=F(y_1)+f(y_2)$. Simplifying (6) then leads to the result that the maximum number of points—i.e., clamp level $n_{max}$—at any luminance level given a maximum slope is $$n_{max} = \frac{slope_{max} \times N}{255} \quad (7)$$

where $slope_{max}$ is the maximum slope desired in the CDF. The number 255 is present assuming the luminance levels have 8-bit resolution.

Figure 3:
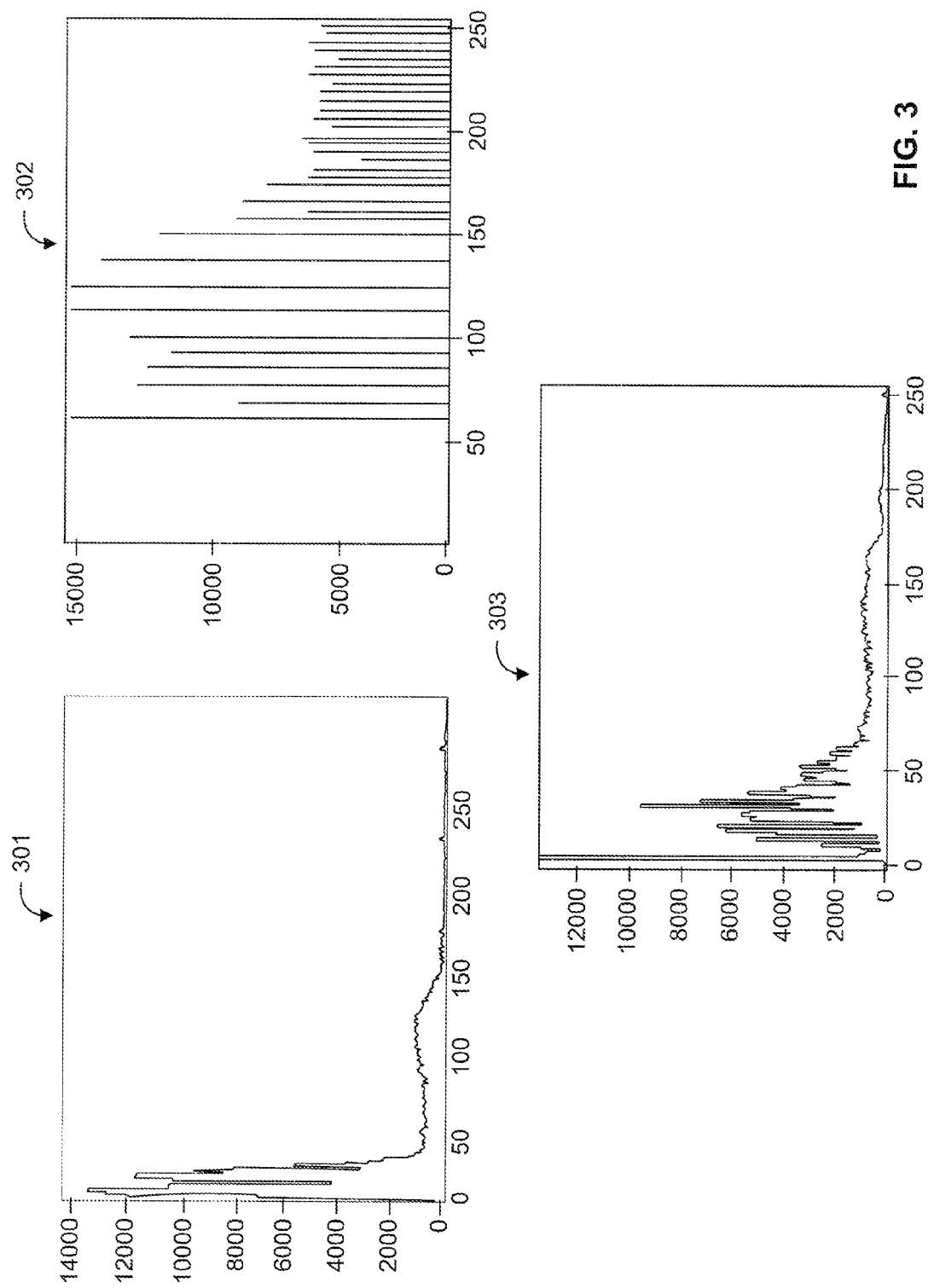
FIG. 3 shows an example of histogram equalization and contrast limited histogram equalization on an example image.

Once the histogram has been clamped, the number of points lost due to clamping preferably is divided by the number of luminance levels and this value preferably is added back to the histogram at each luminance level. Since some points are added back in the peak regions as well, the maximum slope condition may be violated to a small degree. If required, the redistribution process can be repeated iteratively until the maximum slope condition is fulfilled. In any event, the first stage of clamping and redistribution normally provides the maximum benefit. The histogram 303 in the bottom center of FIG. 3 shows an example of CLHE (done separately by dividing the image into four blocks). The improvement over plain histogram equalization (upper right histogram 302) is significant.

Figure 4:
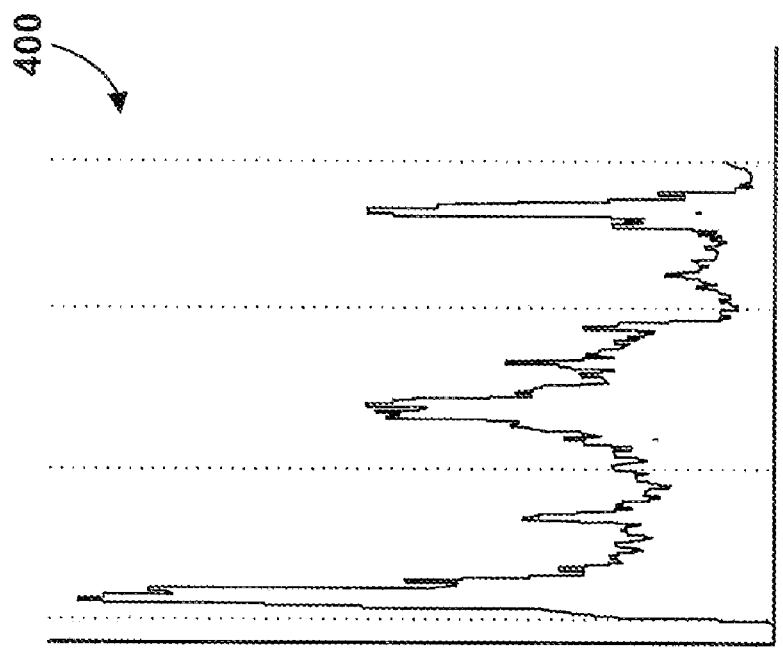
FIG. 4 is an example histogram of an image that has been divided into three regions in accordance with the present invention.

In addition to clamping the histogram as described, in a preferred embodiment of the invention, the histogram preferably is first divided into regions, which preferably are of programmable size. Preferably, there are three regions corresponding to "shadows", "mid-tones" and "highlights" (or "dark," "mid" and "bright") as described above. Each region preferably is then processed separately using CLHE with independent controls. FIG. 4 is an example histogram 400 of an image that has been divided into three regions in accordance with the present invention.

Figure 5:
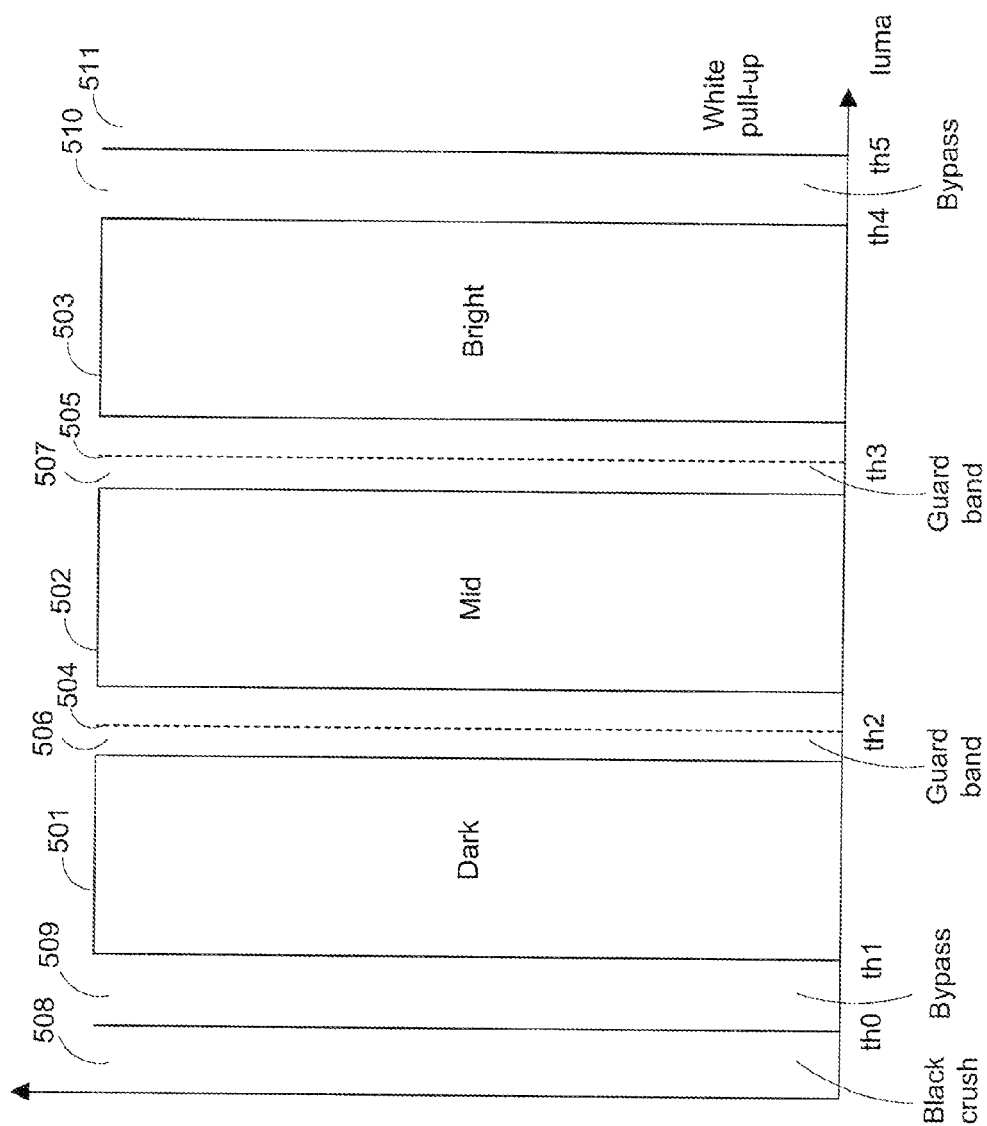
FIG. 5 illustrates the division of the luminance region into three primary regions with guard bands and regions of bypass, black crush and white pull-up.

As discussed above, the splitting of the histogram into three regions facilitates processing each region independently of the other. However, one result of this type of division is that the CDF of the total region may become discontinuous which can result in artifacts in the output picture. Therefore, in accordance with an embodiment of the present invention, the artifacts can be alleviated to a large degree by including "guard band regions" 56, 507 around the dividing lines 504, 505 between dark region 501 and mid region 502, and between mid region 502 and bright region 503 as shown in FIG. 5. Pixels that fall inside either guard-band region 506, 507 are bypassed and not used to calculate the histogram or the CDF. Preferably, in the guard band region 506, 507, the CDF is a straight line with slope 1. Alternatively, the CDF in the guard band could be a straight line connecting the endpoints of the neighboring regions.

In addition to the divisions described above, there preferably is also a black crush region 508 and a bypass region 509 at the dark end of the luminance range. For input pixels in the black crush region 508, the output preferably is a fixed programmable value while pixels in the bypass region 509 preferably are left untouched. This provides increased flexibility required to handle video from different sources and/or to conform to different standards. Preferably there are similar regions—e.g., bypass region 510 and white pull-up region 511—at the bright end of the luminance range as well. For example, the typical luminance range in NTSC video is 16-235. If bypass regions were not present, it would be possible for the output of histogram equalization to fall outside the valid luminance range. If values outside this range are defined to be in a bypass region, then the output of the contrast enhancement algorithm will lie in the valid range of 16-235. The black crush and white pull-up regions 508, 511 can be used to ensure that any input pixel less than 16 or greater than 235 is set to 16 or 235, respectively.

Another use of bypass regions is to avoid processing letterbox boundaries, such as those used when source video material with a 16:9 aspect ratio is displayed in video with a 4:3 aspect ratio. Such video has dark upper and lower boundaries. If these regions are processed, they may skew the histogram of the image resulting in sub-optimal output. These regions also may themselves be made lighter as a result of processing, which also is not desirable. These problems can be avoided by programming dark bypass region 509 to include luminance values typical to letterbox boundaries. This helps ensure that only valid video pixels are processed and enhanced. The width of each region can be defined by programming the thresholds th0-th5 in FIG. 5.

The output pixel is then found using the equation $$y_{out} = wf \times y_{eq} + (1-wf) \times y_{in} \quad (8)$$

where $y_{eq}$ can be calculated from equation (5) (where $F_k(y)$ is computed after clamping the histogram) and $y_{in}$ is the brightness of the original pixel. Equation (8) provides a weighted average between the original and equalized values for each pixel where wf is a weighting factor that can range from 0 to 1. Equation (8) preferably is calculated for each of the three regions independently. The blending process controls the level of contrast enhancement for each region. The maximum slope parameters preferably also are defined independently for the three regions. For pixels in the bypass and guard-band regions, wf preferably is set to 0. For pixels in the black crush and white pull-up regions, the output preferably is read directly from programmable registers, allowing the user to set the values for those regions. This is one preferred embodiment of how, in the example above, all pixels in the black crush region can set to 16 and all pixels in the white pull-up region can be set to 235.

Figure 6:
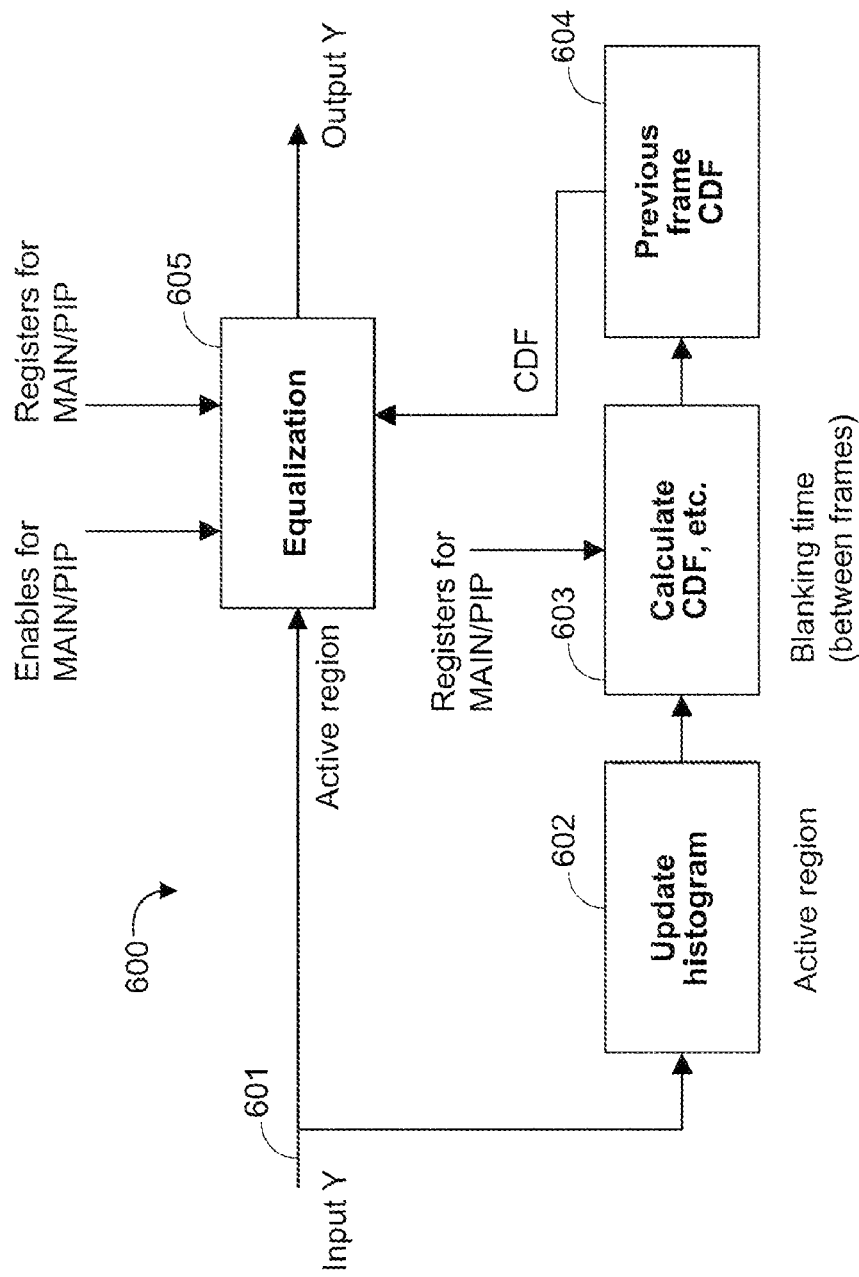
FIG. 6 is a block diagram of a contrast enhancer in accordance with the present invention.

The block diagram of FIG. 6 shows a preferred embodiment of a method 600 according to the invention, which may be carried out in a suitably programmed processor, or in dedicated hardware. The current frame luminance Y is input at 601. At 602, the histogram for each region of the current frame is updated. At the same time, counters with number of points for each of the three regions are updated (not shown). Because method 600 is being performed on the live frame, the PDF ordinarily is not calculated, to avoid a division at each histogram location which is computationally intensive. Therefore, the histogram and cumulative histogram preferably are computed without calculating the actual PDF.

The histogram updating 602 is typically completed at the end of the each frame. During the blanking interval following that frame, the histogram and CDF preferably are calculated at 603. Preferably, the histogram for each region is calculated and clamped based on the maximum slope parameters for each of respective region. For each region, the histogram preferably is accumulated to find the cumulative histogram. The accumulation can be done by reading the histogram value from each memory location and replacing it with the cumulative value. At the end of each region, the accumulation preferably is reset. The reciprocal of the number of points in each region preferably is used with the histogram to calculate the CDF at 604, which is the CDF of one frame previous to the now-current frame. The previous-frame CDF 604 preferably is used at equalization block 605 to process the current frame.

In equalization block 605, the output preferably is calculated as in equation (5) using the input luminance, weighting factors, guard band region widths, reciprocal of the number of points and cumulative histogram, which preferably have been stored from the previous frame at 604. These statistics of the previous frame preferably are used to enhance the current frame. As discussed, the histogram of the current frame is stored in another memory as at 602. Thus preferably two memories are used and can be alternated between holding the current histogram (step 602) and previous cumulative histogram (step 604).

In an alternate embodiment, still using two memories that alternate between holding the current histogram and the previous cumulative histogram on a real-time basis, statistics from a particular frame may be used to enhance that same frame, instead of the next frame. This requires the addition of a frame buffer to retain each frame until its histogram and CDF can be calculated.

The level of enhancement can be varied for different regions. By controlling the enhancement by clamping the histogram of each region, the method reduces contouring in images that have sharp peaks in their histograms. By varying the enhancement based on region, the method can enhance darker regions more than brighter ones, which leads to perceptually better images than traditional histogram equalization based schemes.

The method according to the invention may be implemented in digital logic. The only storage required according to one embodiment is a memory to store histograms because the enhancement may be applied to each video frame based upon the previous one. Many calculations that are performed during inactive signal time (e.g., during blanking intervals) also can be optimized to reduce the area and timing constraints of the implementing logic circuitry.

One skilled in the art will appreciate that the present invention can be practiced by other than the described embodiments, which are presented for purposes of illustration and not of limitation, and the present invention is limited only by the claims which follow.

What is claimed is:

1. A method for processing a received video signal, said method comprising:
    deriving a first histogram of said received video signal of an image wherein the first histogram comprises statistical information regarding luminance of pixels in the image;
    clamping said first histogram at a maximum value, and distributing points in said first histogram above said maximum value to other luminance values in said first histogram to derive a second histogram;
    deriving a cumulative density function (CDF) from said second histogram; and
    providing an output pixel of an output video signal by processing an input pixel and said cumulative density function.

2. The method of claim 1 wherein said processing is performed on a pixel in a frame from which said first histogram is derived.

3. The method of claim 1 wherein said processing is performed on a pixel in a frame other than a frame from which said first histogram is derived.

4. The method of claim 3 wherein said frame other than said frame from which said first histogram is derived comprises a frame following said frame from which said first histogram is derived.

5. The method of claim 1 wherein:
    said deriving a first histogram comprises deriving a plurality of first histograms corresponding to a plurality of luminance regions;
    said clamping comprises clamping each of said first histograms to derive a plurality of second histograms;
    said deriving a CDF comprises deriving a plurality of CDFs from said plurality of second histograms; and
    said processing comprises processing said input pixel based on one of said plurality of CDFs corresponding to a luminance region in which said input pixel falls.

6. The method of claim 5 wherein said clamping each of said first histograms comprises clamping all of said first histograms to a single maximum value.

7. The method of claim 5 wherein said clamping each of said first histograms comprises clamping each of said first histograms to a respective maximum value.

8. The method of claim 5 further comprising providing guard bands between said luminance regions.

9. The method of claim 5 further comprising providing a bypass region before a darkest of said luminance regions.

10. The method of claim 9 further comprising providing a black crush region before said bypass region.

11. The method of claim 5 further comprising providing a bypass region after a brightest of said luminance regions.

12. The method of claim 11 further comprising providing a white pull-up region after said bypass region.

13. A method for processing a received video signal, said method comprising:
    deriving, from said received video signal of an image, a plurality of histograms corresponding to a plurality of luminance regions in said image;
    providing guard bands between said luminance regions;
    deriving a plurality of cumulative density functions (CDFs) from said plurality of histograms; and providing an output pixel of an output video signal by processing an input pixel based on one of said plurality of CDFs corresponding to a luminance region in which said input pixel falls.

14. The method of claim 13 further comprising providing a bypass region before a darkest of said luminance regions.

15. The method of claim 14 further comprising providing a black crush region before said bypass region.

16. The method of claim 13 further comprising providing a bypass region after a brightest of said luminance regions.

17. The method of claim 16 further comprising providing a white pull-up region after said bypass region.

18. Apparatus for processing a received video signal, said apparatus comprising:
   means for deriving a first histogram of said received video signal of an image wherein the first histogram comprises statistical information regarding luminance of pixels in the image;
   means for clamping said first histogram at a maximum value, and distributing points in said first histogram above said maximum value to other luminance values in said first histogram to derive a second histogram;
   means for deriving a cumulative density function (CDF) from said second histogram; and
   means for providing an output pixel of an output video signal by processing an input pixel and said cumulative density function.

19. The apparatus of claim 18 wherein said processing is performed on a pixel in a frame from which said first histogram is derived.

20. The apparatus of claim 18 wherein said processing is performed on a pixel in a frame other than a frame from which said first histogram is derived.

21. The apparatus of claim 20 wherein said frame other than said frame from which said first histogram is derived comprises a frame following said frame from which said first histogram is derived.

22. The apparatus of claim 18 wherein:
   said means for deriving a first histogram comprises means for deriving a plurality of first histograms corresponding to a plurality of luminance regions;
   said means for clamping comprises means for clamping each of said first histograms to derive a plurality of second histograms;
   said means for deriving a CDF comprises means for deriving a plurality of CDFs from said plurality of second histograms; and
   said means for processing comprises means for processing said input pixel based on one of said plurality of CDFs corresponding to a luminance region in which said input pixel falls.

23. The apparatus of claim 22 wherein said means for clamping each of said first histograms comprises means for clamping all of said first histograms to a single maximum value.

24. The apparatus of claim 22 wherein said means for clamping each of said first histograms comprises means for clamping each of said first histograms to a respective maximum value.

25. The apparatus of claim 22 further comprising means for providing guard bands between said luminance regions.

26. The apparatus of claim 22 further comprising means for providing a bypass region before a darkest of said luminance regions.

27. The apparatus of claim 26 further comprising means for providing a black crush region before said bypass region.

28. The apparatus of claim 22 further comprising means for providing a bypass region after a brightest of said luminance regions.

29. The apparatus of claim 28 further comprising means for providing a white pull-up region after said bypass region.

30. Apparatus for processing a received video signal, said apparatus comprising:
   means for deriving a plurality of histograms from said received video signal of an image corresponding to a plurality of luminance regions in said image;
   means for providing guard bands between said luminance regions;
   means for deriving a plurality of cumulative density functions (CDFs) from said plurality of histograms; and
   processing means for providing an output pixel of an output video signal by processing an input pixel based on one of said plurality of CDFs corresponding to a luminance region in which said input pixel falls.

31. The apparatus of claim 30 further comprising means for providing a bypass region before a darkest of said luminance regions.

32. The apparatus of claim 31 further comprising means for providing a black crush region before said bypass region.

33. The apparatus of claim 30 further comprising means for providing a bypass region after a brightest of said luminance regions.

34. The apparatus of claim 33 further comprising means for providing a white pull-up region after said bypass region.

35. Apparatus for processing a received video signal, said apparatus comprising:
   circuitry that derives a first histogram of said received video signal of an image wherein the first histogram comprises statistical information regarding luminance of pixels in the image;
   circuitry that clamps said first histogram at a maximum value, and distributes points in said first histogram above said maximum value to other luminance values in said first histogram to derive a second histogram; and
   a processor that:
   derives a cumulative density function (CDF) from said second histogram, and
   provides an output pixel of an output video signal by processing an input pixel and said cumulative density function.

36. The apparatus of claim 35 wherein said processing is performed on a pixel in a frame from which said first histogram is derived.

37. The apparatus of claim 35 further comprising a frame delay, wherein said processing is performed on a pixel in a frame following a frame from which said first histogram is derived.

38. The apparatus of claim 35 wherein:
   said circuitry that derives a first histogram derives a plurality of first histograms corresponding to a plurality of luminance regions;
   said circuitry, that clamps, clamps each of said first histograms to derive a plurality of second histograms; and
   said processor:
   derives a plurality of CDFs from said plurality of second histograms, and
   processes said input pixel based on one of said plurality of CDFs corresponding to a luminance region corresponding to said input pixel.

39. The apparatus of claim 38 wherein said circuitry, that clamps, clamps all of said first histograms to a single maximum value.

40. The apparatus of claim 38 wherein said circuitry, that clamps, clamps each of said first histograms to a respective maximum value.

41. The apparatus of claim 38 wherein said circuitry that derives the first histogram further provides guard bands between said luminance regions.

42. The apparatus of claim 38 wherein said circuitry that derives the first histogram further provides a bypass region before a darkest of said luminance regions.

43. The apparatus of claim 42 wherein said circuitry that derives the first histogram further provides a black crush region before said bypass region.

44. The apparatus of claim 38 wherein said circuitry that derives the first histogram further provides a bypass region after a brightest of said luminance regions.

45. The apparatus of claim 44 wherein said circuitry that derives the first histogram further provides a white pull-up region after said bypass region.

46. Apparatus for processing a received video signal, said apparatus comprising:
 circuitry that derives a plurality of histograms from said received video signal of an image corresponding to a plurality of luminance regions in said image, and provides guard bands between said luminance regions; and
 a processor that:
   derives a plurality of cumulative density functions (CDFs) from said plurality of histograms; and
   provides an output pixel of an output video signal by processing an input pixel based on one of said plurality of CDFs corresponding to a luminance region in which said input pixel falls.

47. The apparatus of claim 46 wherein said circuitry that derives the plurality of histograms further provides a bypass region before a darkest of said luminance regions.

48. The apparatus of claim 47 wherein said circuitry that derives the plurality of histograms further provides a black crush region before said bypass region.

49. The apparatus of claim 46 wherein said circuitry that derives the plurality of histograms further provides a bypass region after a brightest of said luminance regions.

50. The apparatus of claim 49 wherein said circuitry that derives the plurality of histograms further provides a white pull-up region after said bypass region.

\* \* \* \* \*